United States Patent
Dake

(10) Patent No.: US 10,503,531 B2
(45) Date of Patent: Dec. 10, 2019

(54) LOADING RUNTIME CONFIGURATION FILES INTO VIRTUAL MACHINE INSTANCES WHICH WHEN EXECUTED TRANSFORM A STORED VIRTUAL MACHINE IMAGE INTO A CUSTOMIZED CONFIGURATION

(71) Applicant: Red Hat, Inc., Raleigh, NC (US)

(72) Inventor: Steven Dake, Scottsdale, AZ (US)

(73) Assignee: Red Hat, Inc., Raleigh, NC (US)

( * ) Notice: Subject to any disclaimer, the term of this patent is extended or adjusted under 35 U.S.C. 154(b) by 359 days.

(21) Appl. No.: 14/140,230

(22) Filed: Dec. 24, 2013

(65) Prior Publication Data
US 2015/0178113 A1   Jun. 25, 2015

(51) Int. Cl.
*G06F 9/455*   (2018.01)

(52) U.S. Cl.
CPC ............................. *G06F 9/45558* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 5,884,312 A * | 3/1999 | Dustan | H04L 63/0428 |
| 8,417,938 B1 | 4/2013 | Considine et al. | |
| 8,490,088 B2 | 7/2013 | Tang | |
| 8,539,136 B2 | 9/2013 | Burch et al. | |
| 8,966,479 B2 * | 2/2015 | Nayak | H04L 67/16 |
| | | | 709/229 |

| | | | |
|---|---|---|---|
| 2009/0100420 A1 * | 4/2009 | Sapuntzakis | G06F 8/65 |
| | | | 717/171 |
| 2009/0172662 A1 * | 7/2009 | Liu | G06F 9/44505 |
| | | | 718/1 |
| 2011/0246988 A1 * | 10/2011 | Hui | G06F 9/45558 |
| | | | 718/1 |

(Continued)

FOREIGN PATENT DOCUMENTS

| | | |
|---|---|---|
| WO | WO2008049008 | 4/2008 |
| WO | WO2008054997 | 5/2008 |
| WO | WO2012059292 | 5/2012 |

OTHER PUBLICATIONS

Sam Newman, "AWS: S3 v. EBS-backed Instances" (http://blog.magpiebrain.com/2010/07/19/aws-s3-vs-ebs-backed-instances/), Jul. 19, 2010.

(Continued)

*Primary Examiner* — Meng Ai T An
*Assistant Examiner* — Michael W Ayers
(74) *Attorney, Agent, or Firm* — Lowenstein Sandler LLP

(57) ABSTRACT

Systems and methods for loading runtime configuration files into virtual machine instances. An example method may comprise: storing, by a processing device, a plurality of virtual machine configuration files in a storage memory accessible by a virtual machine instance; creating a file list referencing a virtual machine configuration file of the plurality of virtual machine configuration files, the file list further specifying a target location of the virtual machine configuration file in the virtual machine instance; and causing a boot process of the virtual machine instance to download the virtual machine configuration file specified by the file list from the storage memory into the target location specified by the file list.

18 Claims, 3 Drawing Sheets

(56) References Cited

U.S. PATENT DOCUMENTS

| | | | | |
|---|---|---|---|---|
| 2012/0084775 | A1* | 4/2012 | Lotlikar | G06F 9/45558 |
| | | | | 718/1 |
| 2012/0151256 | A1 | 6/2012 | Tam | |
| 2012/0233668 | A1* | 9/2012 | Leafe | G06F 9/44526 |
| | | | | 726/4 |
| 2012/0246639 | A1* | 9/2012 | Kashyap | G06F 9/45558 |
| | | | | 718/1 |
| 2012/0254852 | A1* | 10/2012 | Emaru | G06F 8/60 |
| | | | | 717/173 |
| 2013/0007733 | A1 | 1/2013 | Fries et al. | |
| 2013/0290952 | A1* | 10/2013 | Childers, Jr. | G06F 9/5077 |
| | | | | 718/1 |
| 2014/0096136 | A1* | 4/2014 | Duan | G06F 9/455 |
| | | | | 718/1 |
| 2014/0245292 | A1* | 8/2014 | Balani | G06F 9/5077 |
| | | | | 718/1 |
| 2015/0074659 | A1* | 3/2015 | Madsen | G06F 8/61 |
| | | | | 717/177 |

OTHER PUBLICATIONS

"Creating an Instance Store-Backed Windows AMI",(http://docs.aws.amazon.com/AWSEC2/latest/WindowsGuide/Creating_InstanceStoreBacked_WinAMI.html), last accessed on Jan. 29, 2014.

"Storage Decisions", (http://docs.openstack.org/developer/swift/overview_architecture.html), last accessed on Jan. 29, 2014.

"Chapter 5. Managing Virtual Machines", (https://access.redhat.com/site/documentation/en-US/Red_Hat_Enterprise_Virtualization/3.1/html/Power_User_Portal_Guide/Power_User_Portal_Guide-Manage_Virtual_Machines.html), last accessed on Jan. 29, 2014.

* cited by examiner

LOADING RUNTIME CONFIGURATION FILES INTO VIRTUAL MACHINE INSTANCES WHICH WHEN EXECUTED TRANSFORM A STORED VIRTUAL MACHINE IMAGE INTO A CUSTOMIZED CONFIGURATION

TECHNICAL FIELD

The present disclosure is generally related to cloud computing, and is more specifically related to loading runtime configuration files into virtual machine instances.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity and measured service. The cloud computing model comprises several service models, including Software as a Service (SaaS), Platform as a Service (PaaS), and Infrastructure as a Service (IaaS). The cloud computing model may be implemented according to one of the several deployment models, including private cloud, community cloud, public cloud and hybrid cloud.

Cloud infrastructure is a collection of hardware and software that implements the cloud computing model. Cloud infrastructure may be viewed as comprising a physical layer and an abstraction layer. The physical layer may comprise hardware resources designed to support the cloud services being provided, and typically includes server, storage and network components. The abstraction layer may comprise the software deployed across the physical layer, which manifests the essential cloud characteristics. Conceptually the abstraction layer resides above the physical layer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for loading configuration files into virtual machine instances. In certain implementations, a configuration file may be provided by a runtime agent, e.g., a script file executable by a virtual machine instance to configure one or more virtual machine instance parameters. Alternatively, a configuration file may be provided by a data file comprising one or more values to be assigned to virtual machine instance parameters.

Using vendor-supplied distribution images (also referred to as "gold" images) of operating systems for building virtual machines in a cloud environment is not always practical, as the virtual machine images may need customization (e.g., custom software configuration). Uploading customized images to an image distribution service where those images may be accessed by the virtual machine instance building processes may not always be practical, e.g., due to the fact that a wide variety of such images may be required for a given cloud environment, thus resulting in a potentially very large number of customized images that would needed to be stored by the image distribution service.

To address the above noted and other deficiencies, the orchestration server may implement the method of loading runtime configuration files into images of virtual machine instances described herein. In accordance with one or more aspects of the present disclosure, runtime configuration files (e.g., in the form of executable script files or other binary applications executable by the virtual machine instance bootstrap process) may be stored in a storage memory which is locally accessible by virtual machine instances. For every instance to be built, a list of runtime configuration files may be compiled by the orchestration process. For every runtime configuration file, the list may specify its target location within the virtual machine instance. The list may be communicated to the virtual machine instance, causing the instance boot process to download the runtime configuration files into the target locations within the virtual machine instance.

Various aspects of the above referenced methods and systems are described in details herein below by way of examples, rather than by way of limitation.

Figure 1:
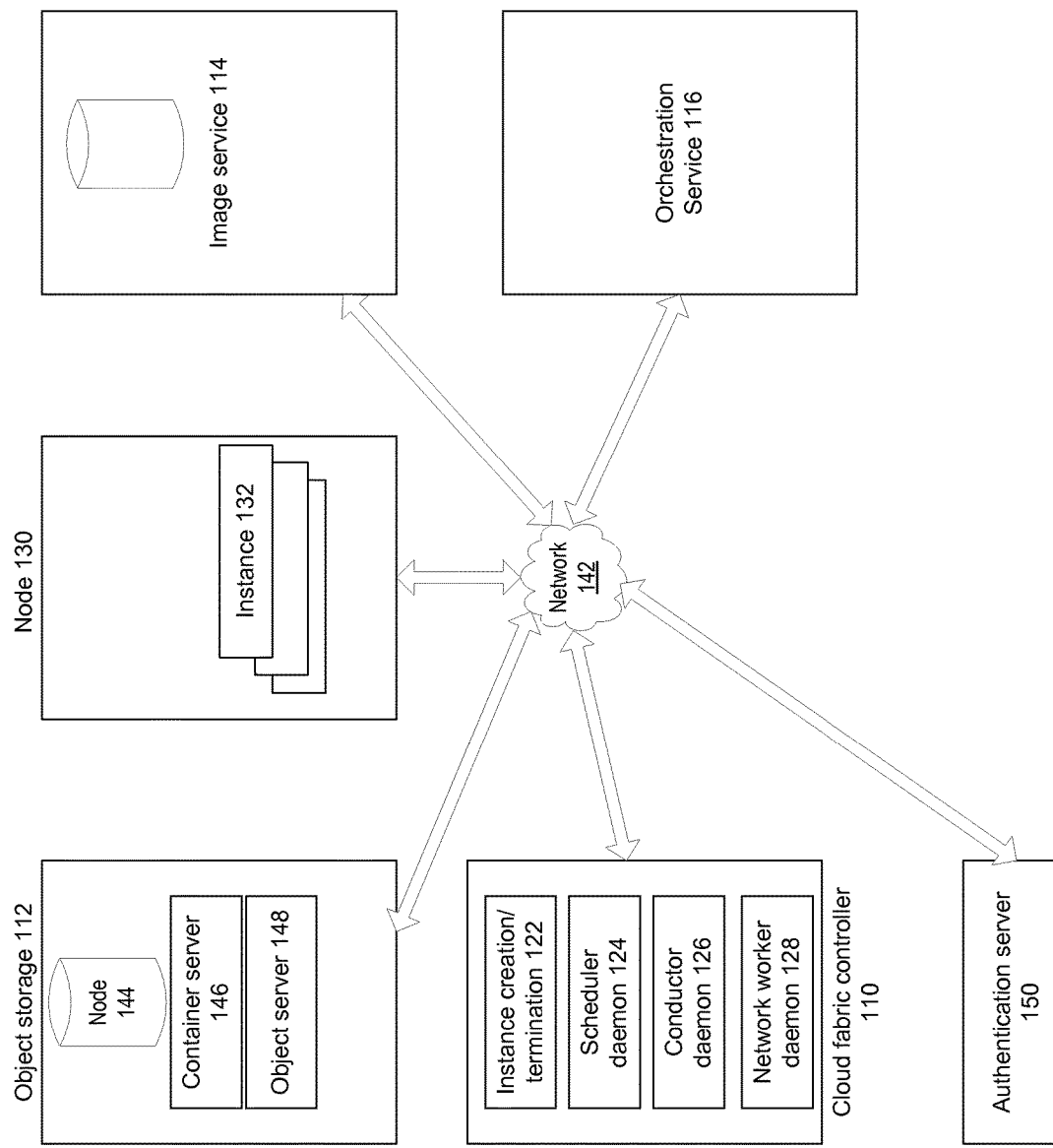
FIG. 1 schematically depicts component diagrams of an example cloud computing platform, in accordance with one or more aspects of the present disclosure.

FIG. 1 schematically depicts a high-level component diagram of an example cloud computing platform represented by a distributed computer system 1000, in accordance with one or more aspects of the present disclosure.

In certain implementations, cloud computing platform 1000 may implement OpenStack platform. Cloud computing platform 1000 may comprise a cloud fabric controller service 110, an object storage service 112, an image service 114, and an orchestration service 116. While FIG. 1 illustrates each of the above listed services running on a dedicated hardware server, in certain implementations, two or more of those services may be collocated on a single hardware server. Servers 100 executing the above listed services may be interconnected by one or more networks 142, including one or more local area networks, one or more wide area networks, or any combination thereof.

Cloud fabric controller service 110 may be employed for hosting and managing cloud computing systems. In the OpenStack platform, the cloud fabric controller functionality may be provided by Compute Service. The cloud fabric controller service may comprise several daemon processes, including a worker daemon 122 that creates and terminates virtual machine instances through hypervisor APIs, a scheduler daemon 124 that retrieves a virtual machine instance requests from a queue and assigns each request to a host computer, a conductor daemon 126 that manages interactions between worker daemon 122 and a cloud database, and a network worker daemon 128 that retrieves and performs networking tasks from a queue.

Object storage service 112 may provide a multi-tenant object storage system for large amounts of unstructured data. In certain implementations, object storage service 112 may implement a REST-compliant application programming interface (API). In an illustrative example, HTTP protocol may be used as the transport layer for the API. In an illustrative example, object storage service 112 may comprise one or more storage nodes 144, one or more container servers 146 to manage mappings of object containers, one or more object servers 148 to manage objects (such as files) on the storage nodes, and one or more authentication servers 150 to manage accounts defined within the object storage service.

Image service 114 may be employed to discover, register, and retrieve virtual machine images. The service includes a REST-compliant API that allows users to query virtual machine image metadata and retrieve images via HTTP requests. Virtual machine images made available through the image service may be stored in a variety of locations, including the object storage service, various file systems, Amazon S3 file system, HTTP access to remote Internet locations, and/or block devices.

Orchestration service 116 may be employed for combining virtual machines, networking elements, and other cloud resources into a running stack. Cloud computing platform 1000 may comprise one or more nodes 130 on which a plurality of virtual machines instances 132 may be instantiated. Cloud computing platform 1000 may provide command line-based, HTTP-based and/or API-based instance management.

In an illustrative example, orchestration service 116 may implement the method of loading runtime configuration files into images of virtual machine instances described herein. Orchestration service 116 may store a plurality of runtime configuration files (e.g., in the form of executable script files or other binary applications executable by the virtual machine instance bootstrap process) in a storage memory which is locally accessible by virtual machine instances. In certain implementations, the storage memory may be provided by object storage service 112 locally accessible by virtual machine instances.

For every instance to be built, orchestration service 116 may compile a list of runtime configuration files to be injected into the instance. For every runtime configuration file, the list may specify its target location (e.g., the full file system path and the filename) within the virtual machine instance, so that the virtual machine instance bootstrap process would be able to reference the runtime configuration file after the configuration file has been successfully injected into the virtual machine instances. In an illustrative example, the list may comprise a plurality of entries, each entry referencing a location from which the file may be retrieved and the target location of the file within the file system of the virtual machine instance. In an illustrative example, the file retrieval location may be specified, e.g., by an object identifier in object storage service 112. In another illustrative example, the file retrieval location may be specified by a network file system (NFS) path and file name, assuming that the referenced NFS volume would be mounted by the virtual machine instance bootstrap process before accessing the NFS location.

Upon compiling the configuration file list, orchestration service 116 may communicate the list to the virtual machine instance, thus causing the instance bootstrap process to download the runtime configuration files into the target locations within the virtual machine instance. In an illustrative example, the instance bootstrap process may be configured to retrieve the list via the User Data interface.

User Data is a mechanism allowing a virtual machine instance to retrieve one or more locally stored files at the instance launch time. The instance can retrieve the files by issuing an HTTP GET request to a pre-defined URI, for example: http://169.254.169.254/user-data.

Upon retrieving the list, the virtual machine instance bootstrap process may process each list element by downloading the specified runtime file and placing the file into the location specified by the list. After the configuration files have been successfully downloaded and placed into the specified locations, the virtual machine instance bootstrap process may use the downloaded files, e.g., by executing the runtime agent scripts and/or retrieving configuration data from the downloaded files.

In certain implementations, the orchestration process may employ the User Data mechanism for transferring the runtime configuration files to the virtual machine instances. Instead of placing the configuration files into the local object storage, the orchestration service may put the files into a local file system employed by the User Data service, so that the virtual machine instance would be able to retrieve the files at the instance launch time, as described herein above.

Figure 2:
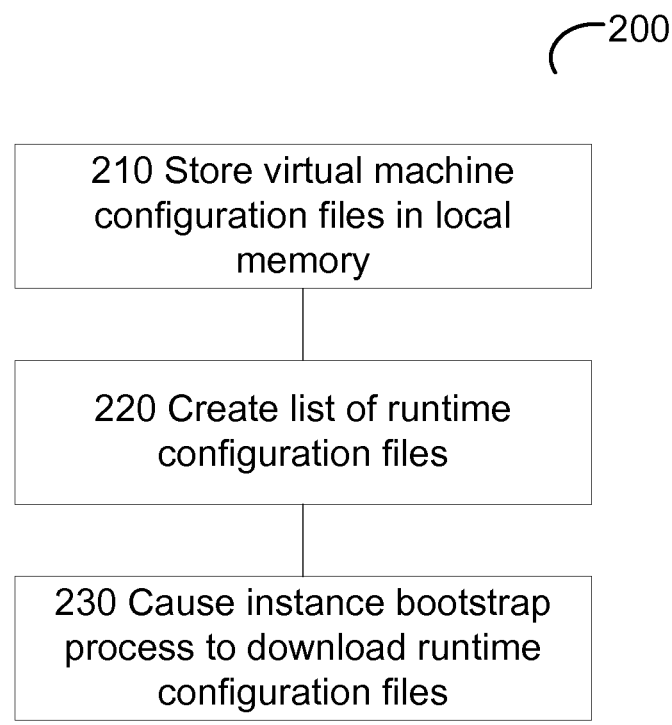
FIG. 2 depicts a flow diagram of an illustrative example of a method for loading runtime configuration files into virtual machine instances, in accordance with one or more aspects of the present disclosure.

FIG. 2 depicts a flow diagram of an example method 200 performed by an orchestration service for loading runtime configuration files into virtual machine instances. Method 200 and/or each of its individual functions, routines, subroutines, or operations may be performed by one or more processors of the computer system (e.g., orchestration server 116 of FIG. 1) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the orchestration service may store a plurality of virtual machine configuration files in a storage memory accessible by a virtual machine instance. In certain implementations, a configuration file may be provided by a runtime agent, e.g., a script file or other binary application executable by a virtual machine instance. In an illustrative example, the storage memory may be provided by an object storage, as described in more details herein above.

In certain implementations, the orchestration process may employ the User Data mechanism for transferring the runtime configuration files to the virtual machine instances, as described in more details herein above.

At block 220, the orchestration service may create a file list referencing one or more configuration files of the plurality of configuration files stored in the local storage memory, to be injected into a virtual machine instance. For every virtual machine configuration file, the list may specify its target location (e.g., the full file system path and the filename) within the virtual machine instance, so that the virtual machine instance bootstrap process would be able to reference the runtime configuration file after the configuration file has been successfully injected into the virtual machine instances, as described in more details herein above.

At block 230, the orchestration service may cause virtual machine instance bootstrap process to download the virtual machine configuration files specified by the file list from the storage memory into the target locations specified by the file list, as described in more details herein above.

Upon completing the operations referenced by block 230, the method may terminate.

Figure 3:
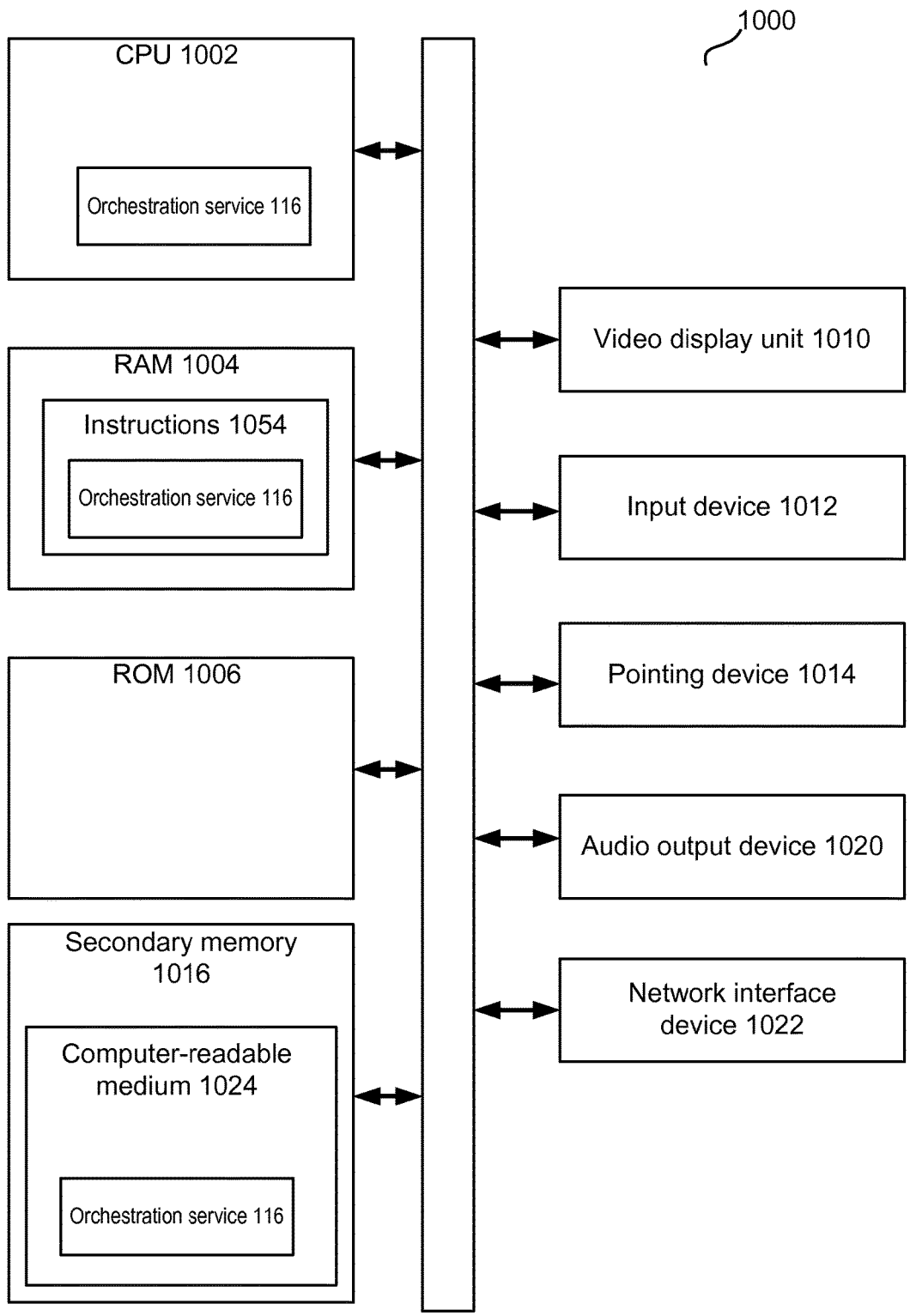
FIG. 3 depicts an illustrative computer system operating in accordance with one or more aspects of the present disclosure.

FIG. 3 depicts an illustrative computer system operating in accordance with examples of the present disclosure. In illustrative examples, computer system 1000 may correspond to orchestration server 116 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding orchestration service 116 of FIG. 1 implementing method 200 for loading runtime configuration files into virtual machine instances in accordance with one or more aspect of the present disclosure. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 200 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   identifying, by a processing device, a plurality of virtual machine configuration files that are utilized to transform a stored virtual machine image to a desired customized configuration, wherein the plurality of virtual machine configuration files are stored in a storage memory accessible by a virtual machine instance;
   creating a file list referencing the plurality of virtual machine configuration files, wherein the file list specifies, for every virtual machine configuration file of the plurality of configuration files, a current location of the virtual machine configuration file in the storage memory and a target location of the virtual machine configuration file in a file system of the virtual machine instance, wherein a virtual machine configuration file of the plurality of configuration files comprises a script executable to modify a parameter of stored virtual machine image in order to transform the stored virtual machine image to the desired customized configuration;

launching the virtual machine instance using the stored virtual machine image;

responsive to receiving, via a User Data interface, an HTTP GET request transmitted by the virtual machine instance to a pre-defined Uniform Resource Identifier (URI), communicating the file list to the virtual machine instance via the User Data interface;

causing the virtual machine instance to retrieve each virtual machine configuration file specified by the file list from the respective current location of the virtual machine configuration file in the storage memory; and causing the virtual machine instance to store each retrieved virtual machine configuration file into the target location specified by the file list and to execute each virtual machine configuration file in order to transform the stored virtual machine image into the desired customized configuration.

2. The method of claim 1, wherein the storage memory is provided by a file system.

3. The method of claim 1, wherein causing the virtual machine instance to retrieve the virtual machine configuration file comprises causing the virtual machine instance to download the virtual machine configuration file from a defined file system location.

4. The method of claim 1, wherein the storage memory comprises a plurality of object containers.

5. The method of claim 1, wherein the storage memory is accessible by the virtual machine instance via a local area network.

6. The method of claim 1, further comprising: creating the virtual machine configuration file before storing the plurality of virtual machine configuration files.

7. A system, comprising:
a memory; and
a processing device, operatively coupled to the memory, to:
identify, by a processing device, a plurality of virtual machine configuration files that are utilized to transform a stored virtual machine image to a desired customized configuration, wherein the plurality of virtual machine configuration files are stored in a storage memory accessible by a virtual machine instance;

create a file list referencing the plurality of virtual machine configuration files, wherein the file list specifies, for every virtual machine configuration file of the plurality of configuration files, a current location of the virtual machine configuration file in the storage memory and a target location of the virtual machine configuration file in a file system of the virtual machine instance, wherein a virtual machine configuration file of the plurality of configuration files comprises a script executable to modify a parameter of the stored virtual machine image in order to transform the stored virtual machine image to the desired customized configuration;

launch the virtual machine instance;

responsive to receiving, via a User Data interface, an HTTP GET request transmitted by the virtual machine instance to a pre-defined Uniform Resource Identifier (URI), communicate the file list to the virtual machine instance via the User Data interface;

cause the virtual machine instance to retrieve each virtual machine configuration file specified by the file list from the respective current location of the virtual machine configuration file in the storage memory; and cause the virtual machine instance to store each retrieved virtual machine configuration file into the target location specified by the file list and to execute each virtual machine configuration file in order to transform the stored virtual machine image into the desired customized configuration.

8. The system of claim 7, wherein the storage memory is provided by a file system.

9. The system of claim 7, wherein the processing device is further to cause the virtual machine instance to download the virtual machine configuration file from a defined file system location.

10. The system of claim 7, wherein the storage memory comprises a plurality of object containers.

11. The system of claim 7, wherein the storage memory is accessible by the virtual machine instance via a local area network.

12. A non-transitory computer-readable storage medium comprising executable instructions that, when executed by a processing device of a file system server, cause the processing device to:
identify, by a processing device, a plurality of virtual machine configuration files that are utilized to transform a stored virtual machine image to a desired customized configuration, wherein the plurality of virtual machine configuration files are stored in a storage memory accessible by a virtual machine instance;

create a file list referencing the plurality of virtual machine configuration files, wherein the file list specifies, for every virtual machine configuration file of the plurality of configuration files, a current location of the virtual machine configuration file in the storage memory and a target location of the virtual machine configuration file in a file system of the virtual machine instance, wherein a virtual machine configuration file of the plurality of configuration files comprises a script executable to modify a parameter of the stored virtual machine image in order to transform the stored virtual machine image to the desired customized configuration;

launch the virtual machine instance;

responsive to receiving, via a User Data interface, an HTTP GET request transmitted by the virtual machine instance to a pre-defined Uniform Resource Identifier (URI), communicate the file list to the virtual machine instance via the User Data interface;

cause the virtual machine instance to retrieve each virtual machine configuration file specified by the file list from the respective current location of the virtual machine configuration file in the storage memory; and cause the virtual machine instance to store each retrieved virtual machine configuration file into the target location specified by the file list and to execute each virtual machine configuration file in order to transform the stored virtual machine image into the desired customized configuration.

13. The non-transitory computer-readable storage medium of claim 12, further comprising executable instruction causing the processing device to cause the virtual machine instance to download the virtual machine configuration file from a defined file system location.

14. The non-transitory computer-readable storage medium of claim 12, wherein the storage memory is accessible by the virtual machine instance via a local area network connection.

15. The non-transitory computer-readable storage medium of claim 12, wherein the storage memory comprises a plurality of object containers.

16. The method of claim 1, wherein a second virtual machine configuration file of the plurality of configuration files comprises a data file storing one or more values to be assigned to virtual machine configuration parameters.

17. The method of claim 1, further comprising:
   causing the virtual machine instance to execute the script to modify the parameter of the virtual machine instance.

18. The non-transitory computer-readable storage medium of claim 12, wherein a second virtual machine configuration file of the plurality of configuration files comprises a data file storing one or more values to be assigned to virtual machine configuration parameters.

* * * * *